United States Patent [19]

Patriquin

[11] E Re. 29,744

[45] Reissued Aug. 29, 1978

[54] KEY CONTROLLED SECURITY APPARATUS

[76] Inventor: George P. Patriquin, 69 Lynde St., Gardner, Mass. 01440

[21] Appl. No.: 815,259

[22] Filed: Jul. 13, 1977

Related U.S. Patent Documents

Reissue of:

[64] Patent No.: 3,973,421
Issued: Aug. 10, 1976
Appl. No.: 565,777
Filed: Apr. 7, 1975

[51] Int. Cl.[2] ..... E05B 27/00

[52] U.S. Cl. ..... 70/364 R; 70/337; 70/340

[58] Field of Search ..... 70/337, 338, 339, 340, 70/341, 342, 343, 364 R, 376, 377, 382

[56] References Cited

U.S. PATENT DOCUMENTS

| | | | |
|---|---|---|---|
| 1,561,223 | 11/1925 | Fremon | 70/340 |
| 1,725,557 | 8/1929 | Baird | 70/364 R |
| 1,747,383 | 2/1930 | Norviel | 70/364 R |
| 2,113,007 | 4/1938 | Swanson | 70/340 |
| 2,580,882 | 1/1952 | Blohm | 70/364 R |
| 2,612,975 | 10/1952 | Gallagher | 70/337 |
| 2,667,785 | 2/1954 | Opocensky | 70/337 |

FOREIGN PATENT DOCUMENTS

| | | | |
|---|---|---|---|
| 1,390,263 | 1/1965 | France | 70/364 R |
| 1,959,018 | 5/1971 | Fed. Rep. of Germany | 70/337 |

*Primary Examiner*—Robert L. Wolfe

[57] ABSTRACT

A security apparatus including a cylinder lock with an actuator plug rotatably mounted within a hollow cylindrical housing. Retained by the actuator plug are a plurality of locking wafers that are spring biased into a locking spline formed in the inner surface of the housing so as to retain the plug in a locked station. Also retained by the plug is a first directional wafer, spring biased into a quiescent position wherein it allows counterclockwise rotation of the plug from a locked station but prevents clockwise rotation thereof and movable into an active position wherein it allows either clockwise or counterclockwise rotation of the plug. A second directional wafer is spring biased in a primary position wherein it permits both clockwise and counterclockwise rotation of the plug from the locked station and movable into an intermediate position wherein it allows clockwise rotation but prevents counterclockwise rotation of the plug. A first control key is bitted so as to pull the locking wafers to shear positions out of the locking spline while leaving the first and second directional wafers in their quiescent and primary positions, respectively, A second control key is bitted so as to pull the locking wafers into shear positions and draw the first and second directional wafers into their active and intermediate positions, respectively. Finally, a master key is bitted so as to draw the locking wafers into shear positions, pull the first directional wafer into its active position and leave the second directional wafer in its primary position.

17 Claims, 8 Drawing Figures

KEY CONTROLLED SECURITY APPARATUS

Matter enclosed in heavy brackets [ ] appears in the original patent but forms no part of this reissue specification; matter printed in italics indicates the additions made by reissue.

BACKGROUND OF THE INVENTION

This invention relates generally to a combination lock and key security apparatus and, more particularly, to such an apparatus in which each of a plurality of keys uniquely activates wafer tumblers so as to control movement of a lock to different operational stations.

Conventional cylinder locks employ a key actuated plug rotatably mounted within a cylindrical housing. The plug typically retains a plurality of tumblers that are spring biased into engagement with an accommodating spline on the inner surface of the housing and thereby prevent rotation of the plug within the housing. Insertion of a properly bitted key into the plug draws the tumblers to shear positions and allows the plug to rotate into other positions. Additional rotation control of the plug often is provided by stop washers that rotate with the plug and engage stops on the housing so as to limit angular movement of the plug. A stop washer can in one case limit movement of the plug in only one direction from a locked position to a single unlocked station circumferentially spaced therefrom or can alternatively allow rotational movement in opposite directions from a locked position to a maximum of two operational stations circumferentially spaced therefrom. However, even in the latter case the direction of plug rotation and therefore access to either operational station is at the discretion of a user possessing the proper key.

Recent security developments, particularly in the field of locking electrical switches, require locks having a plurality of operational stations the access to each of which can be independently controlled. For example, many businesses now employ cash registers connected to computer systems that either receive or furnish financial and inventory data associated with individual transactions. It is often desirable in these instances that the access to specific input and output terminals of the computer system be limited to particular personnel responsible for given activities.

The object of this invention, therefore, is to provide a lock having a plurality of operational stations the access to each of which can be independently controlled.

SUMMARY OF THE INVENTION

The present invention is a security apparatus including a cylinder lock with an actuator plug rotatably mounted within a hollow cylindrical housing. Retained by the actuator plug are a plurality of locking wafers that are spring biased into a locking spline formed in the inner surface of the housing so as to retain the plug in a locked station. Also retained by the plug is a first directional wafer, spring biased into a quiescent position wherein it allows counterclockwise rotation of the plug from a locked station but prevents clockwise rotation thereof and movable into an active position wherein it allows either clockwise or counterclockwise rotation of the plug. A second directional wafer is spring biased in a primary position wherein it permits both clockwise and counterclockwise rotation of the plug from the locked station and movable into an intermediate position wherein it allows clockwise rotation but prevents counterclockwise rotation of the plug. A first control key is bitted so as to pull the locking wafers to shear positions out of the locking spline while leaving the first and second directional wafers in their quiescent and primary positions, respectively. Thus, the first control key can be utilized to rotate the plug counterclockwise from its locked station to a first operational station at which further rotation is prevented by engagement between the housing and a stop washer secured to the plug. A second control key is bitted so as to pull the locking wafers into shear positions and draw the first and second directional wafers into their active and intermediate positions, respectively. The second key, therefore, can be utilized to rotate the plug only in a clockwise direction from the locked station to a second operational station at which further rotational movement is prevented again by engagement between the housing and the stop washer. Finally, a master key is bitted so as to draw the locking wafers into shear positions, pull the first directional wafer into its active position and leave the second directional wafer in its primary position. The master key can be used to rotate the plug either in a counterclockwise direction to the first station or in a clockwise direction to the second station. Thus the present invention provides a multi-stationed lock in which independent access to the stations is attained by uniquely bitted keys.

In a preferred embodiment of the above-described invention, the housing defines a tumbler stop that establishes a third operational station located between the locked station and the second station. The tumbler stop is engaged by the second directional wafer when in an auxiliary position so as to prevent clockwise rotation in the actuator plug beyond the third station but is not engaged with the second wafer in either of its primary or intermediate positions which allow continued clockwise rotation of the plug to the second station. This embodiment includes a third control key bitted so as to pull the locking wafers to shear positions and draw the first directional wafer and the second directional wafer into their active and auxiliary positions, respectively. The third control key cannot effect counterclockwise rotation of the plug to the first station but can produce clockwise rotation of the plug to the third station only where the second wafer contacts the tumbler stop.

DESCRIPTION OF THE DRAWINGS

These and other objects and features of the present invention will become apparent upon a perusal of the following description taken in conjunction with the accompanying drawings wherein.

DESCRIPTION OF THE PREFERRED EMBODIMENT

Figure 1:
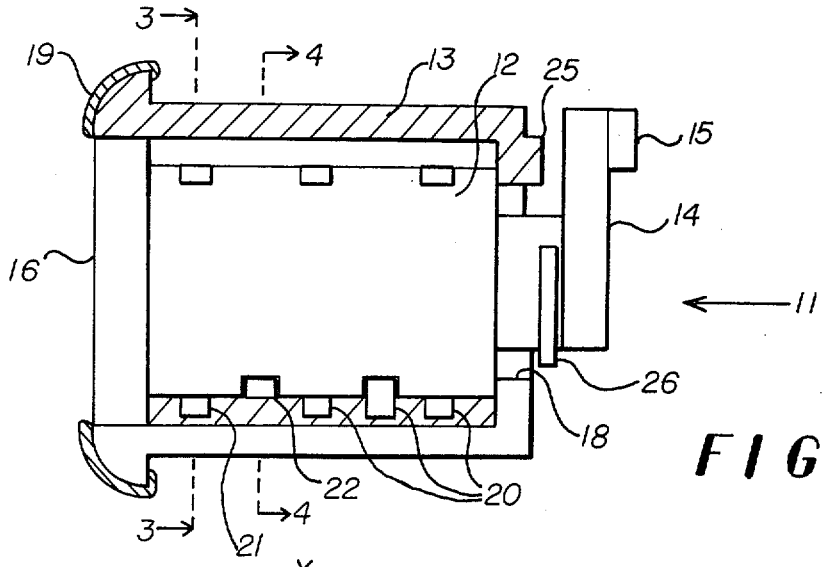
FIG. 1 is a side cross-sectional view of a cylinder lock according to the invention.

Referring now to FIG. 1 there is shown a lock 11 including an actuator plug 12 rotatably mounted within a hollow cylindrical housing 13. Fixed to one end of the plug 12 for rotation therewith is a cam operator arm 14 that supports a permanent magnet 15. The opposite end 16 of the plug 12 defines in the conventional manner a keyway for a proper key. Axially retaining the plug 12 within the housing 13 are a shoulder portion 18 extending inwardly at one end of the housing 13 and a cap member 19 secured over the opposite end thereof. Retained by the actuator plug 12 are a plurality of locking tumbler wafers 20, a first directional tumbler wafer 21 and a second directional tumbler wafer 22 all of which will be described in greater detail hereinafter. Extending from the housing 13 is a stop 25 that is engaged by contact portions of a stop washer 26 secured to the actuator plug 12 in response to rotation thereof in either direction. The stop 25 and stop washer 26 are positioned so as to limit counterclockwise rotation of the plug 12 from a locked position X as viewed in FIG. 2 to a first operation station A and to limit clockwise rotation thereof to a second operational station B.

Figure 2:
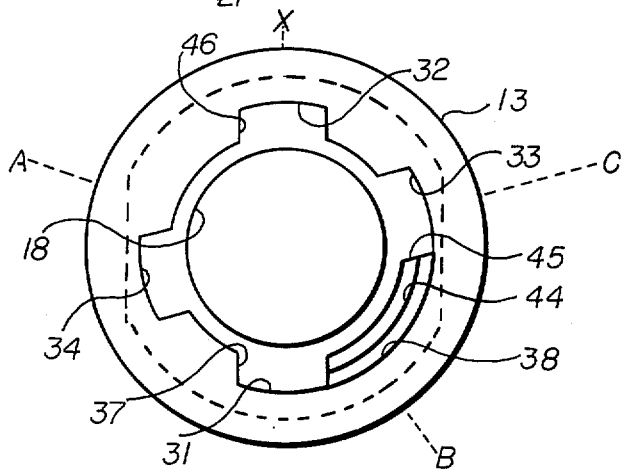
FIG. 2 is a front end view of the lock housing shown in FIG. 1 with the actuator plug removed.

Referring now to FIG. 2 there is shown more clearly the interior of the housing 13 with the plug 12 removed. Formed in the inner surface of the housing 13 is a lower locking spline 31 into which the locking wafers 20 are spring biased to retain the plug 12 in the locked position X. Also formed in the housing 13 is an upper spline 32 that receives the locking wafers 20 during transient movement into shear positions as a proper key is inserted into the plug 12. Additional diametrically opposed splines 33 and 34 accommodate the wafers 20–24 with the actuator plug 12 in a third operational station C located between the locked station X and the second station B.

Figure 3:
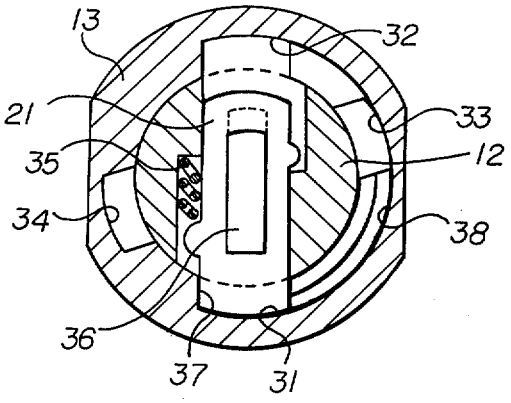
FIG. 3 is a cross-sectional view taken along lines 3—3 of FIG. 1.

As shown in FIG. 3 the first directional wafer 21 is biased by a spring member 35 into a quiescent position shown by solid lines and is movable into an active position shown by dotted lines in response to insertion of a proper key into a keyway 36 through the plug 12. An arcuate portion 38 of the housing 13 between the splines 31 and 32 and transversely adjacent the first wafer 21 is cored out leaving a first arcuate blocking shoulder 37. The shoulder 37 engages the first wafer 21 when in its quiescent position to prevent clockwise rotation of the plug 12 from locked station X while the cored-out portion 38 allows counterclockwise movement thereof.

Figure 4:
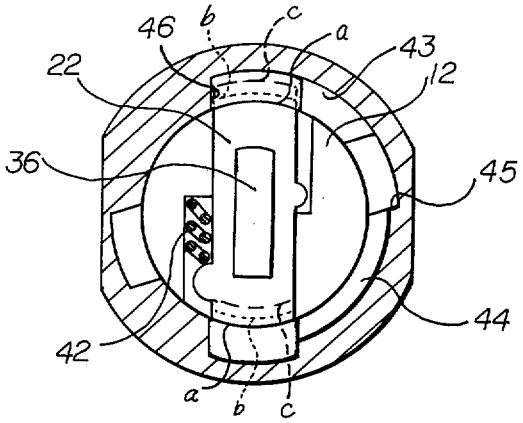
FIG. 4 is a cross-sectional view taken along lines 4—4 of FIG. 1.

Referring now to FIG. 4, there is shown the second directional wafer 22 that is biased into a primary position (a) shown by solid lines and movable into either an intermediate position (b) shown by dotted lines or an auxiliary position (c) shown by dashed lines in response to insertion of appropriate keys into the keyway 36. Transversely adjacent the second wafer 22, an arcuate portion 43 of the housing 13 is cored out between the splines 32 and 33 and an arcuate portion 44 of lesser depth is cored out between the splines 31 and 33 leaving an arcuate tumbler stop portion 45. Radially opposite the cored-out portions 43 and 44 remains a second arcuate blocking shoulder 46 that engages the second wafer 22 in either of its intermediate or auxiliary positions b and c to prevent counterclockwise rotation of the plug 12 from the locked station X. The height of the shoulder stop 45 is such as to engage the second wafer 22 in its auxiliary position c but not to engage it in its intermediate position b during clockwise rotation of the plug 12. Thus, with the second wafer 22 in its auxiliary position c the shoulder stop 45 prevents clockwise rotation of the plug beyond the third operational station C.

Figure 5:
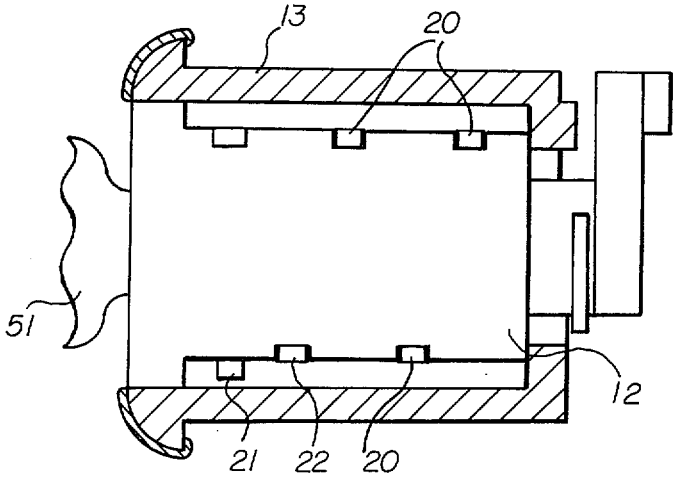
FIG. 5 is a cross-sectional view similar to FIG. 1 after insertion of a first control key.

Referring now to FIG. 5 there is shown a first control key 51 inserted into the keyway 36 in the plug 12. The first key 51 is bitted so as to pull all of the locking wafers 20 into shear positions, while leaving the first wafer 21 in its quiescent position and the second wafer 22 in its primary position a. Therefore, insertion of the first control key 51 allows counterclockwise rotation of the plug to operational station A where further rotation is prevented by the stops 25 and 26. However, clockwise rotation is prevented by engagement between the first wafer 21 and the first shoulder 37.

Figure 6:
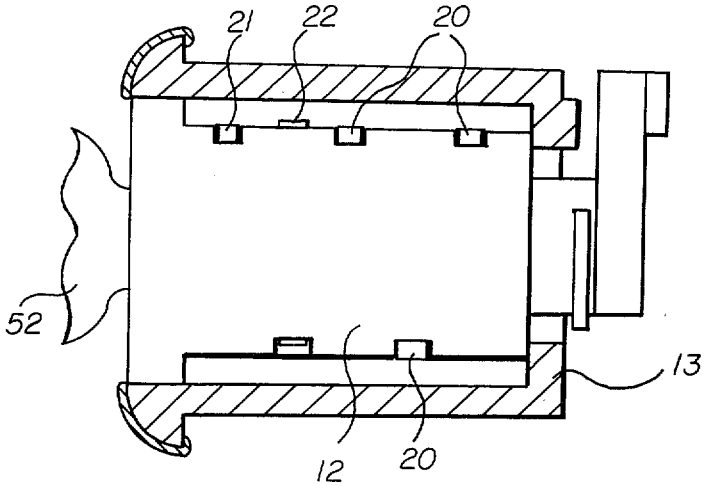
FIG. 6 is a cross-sectional view of the lock of FIG. 1 after insertion of a second control key.

Referring now to FIG. 6 there is shown a second control key 52 inserted into the keyway 36. The second control key 52 is bitted so as to pull all of the locking wafers 20 into their shear positions, to pull the first directional wafer 21 into its active position and draw the second directional wafer 22 into its intermediate position b. Insertion of the second control key 25 allows clockwise rotation of the plug 12 from station X to the second operational station B wherein further rotation is prevented by engagement between the stops 25 and 26. However, counterclockwise rotation of the plug 12 from the locked station X is prevented by engagement between the second directional wafer 22 and the second shoulder 46.

Figure 7:
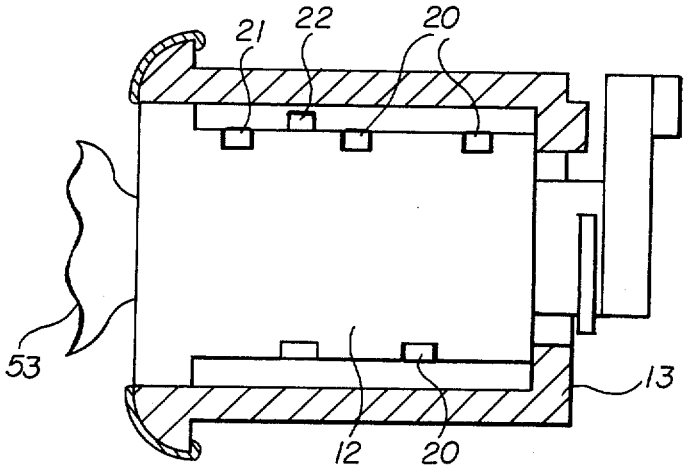
FIG. 7 is a cross-sectional view of the lock in FIG. 1 after insertion of a third control key.

In FIG. 7 there is shown a third control key 53 inserted into the keyway 36. The third control key 53 is bitted so as to draw all of the locking wafers 20 in their shear positions, to pull the first wafer 21 into its active position and to draw the second directional wafer into its auxiliary position c. Insertion of the third control key 53 allows clockwise rotation of the plug 12 from the locked station X to the third station C whereat the second directional wafer 22 engages the tumbler stop 45 to prevent further clockwise rotation. Similarly, counterclockwise rotation from station X is prevented by engagement between the second wafer 22 and the blocking shoulder 46.

Figure 8:
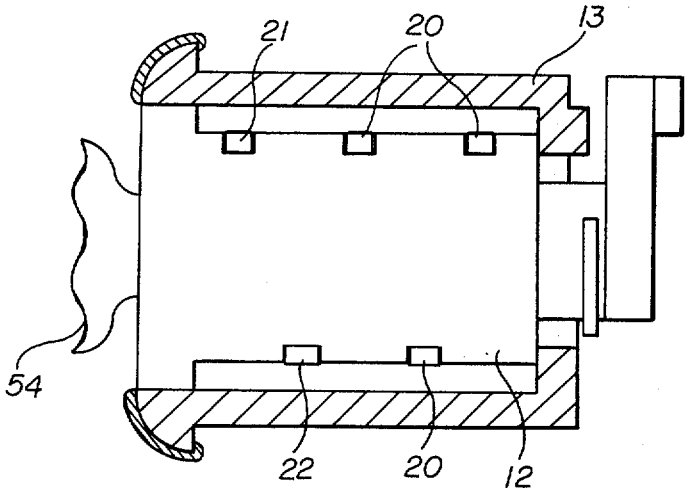
FIG. 8 is a cross-sectional view of the lock in FIG. 1 after insertion of a master key.

Finally, there is shown in FIG. 8 a master key 54 inserted into the keyway 36. The master key 54 is bitted so as to draw all of the locking wafers 20 in their shear positions, to draw the first directional wafer 21 to its active position and to leave the second directional wafer 22 in its primary position a. Thus, the master key 54 can be employed to rotate the plug 12 from the locked station X in a counterclockwise direction to the first operational station A or in a clockwise direction to either of the operational stations B or C at the discretion of the user.

Obviously, many modifications and variations of the present invention are possible in light of the above teachings. For example, although the specifically illustrated relative locations of the wafers 20–22 and the disclosed biased positions of the directional wafers 21 and 22 are preferred because they eliminate undercuts and thereby simplify casting and machining operations required in the construction of the housing 13, other arrangements also could be employed. It is to be understood, therefore, that the invention can be practiced otherwise than as specifically described.

What is claimed is:

1. A lock comprising:

a housing;

an actuator means retained by and rotatable between predetermined stations within said housing, said actuator defining a keyway for receiving a key;

operator means for effecting control functions in response to rotation of said actuator means into said predetermined stations;

locking tumbler means coupled between said housing and said actuator means and extending into said keyway, said locking tumbler means being biased in a locking position and movable into a shear position by a proper key in said keyway;

locking tumber blocking means preventing rotational movement of said actuator means from a locked station with said locking tumbler means in said locking positions and allowing rotational movement thereof with said locking tumbler means in said shear positions;

first directional tumbler means coupled between said housing and said actuator means and extending into said keyway, said first directional tumbler means movable between a quiescent position and an active position by a proper key in said keyway;

first blocking means allowing rotation of said actuator means in one direction from said locked station and preventing rotation thereof in the opposite direction with said first tumbler means in said quiescent position, and allowing rotation of said actuator means in said opposite direction from said locked station with said first tumbler means in said active position;

second directional tumbler means coupled between said housing and said actuator means and extending into said keyway, said second directional tumbler means being movable between a primary position and an auxiliary position by a proper key in said keyway; and second blocking means allowing rotation of said actuator means in said one direction from said locked station with said second tumbler means in said primary position, and allowing rotation of said actuator means in said opposite direction from said locked station and preventing rotation thereof in said one direction with said second tumbler means in said auxiliary position.

2. A lock according to claim 1 including first stop means preventing rotation of said actuator means in said one direction beyond a first station circumferentially spaced from said locked station, and second stop means preventing rotation of said actuator means in said opposite direction beyond a second station circumferentially spaced from said locked station.

3. A lock according to claim 2 including tumbler stop means effective with said second tumbler means in said other position to prevent rotation of said actuator means in said opposite direction beyond a third station circumferentially spaced between said locked station and said second station, and wherein said second tumbler means is movable by a proper key in said keyway into an intermediate position wherein said second blocking means prevents rotation of said actuator means in said one direction from said locked station and said tumbler stop means allows rotation of said actuator means between said locked, second and third stations.

4. A lock according to claim 3 wherein said first directional tumbler means is biased in said quiescent position, and said second directional tumbler means is biased in said primary position.

5. A lock according to claim 4 wherein said actuator means defines an entry to said keyway, said tumbler means extend into said keyway at axially spaced locations therein so as to be sequentially engaged by a key entering said keyway, said first directional tumbler means is the nearest to said entry, and said second directional tumbler means is located between said first directional tumbler means and said locking tumbler means.

6. A lock according to claim 3 wherein said actuator means is a cylindrical plug, said housing is a hollow cylinder, and said first and second blocking means and said tumbler stop means comprise splines formed in the inner surface of said hollow cylinder so as to engage portions of said first and second directional tumbler means extending out of said actuator means.

7. A lock according to claim 6 wherein said operator means comprises means for operating an electrical switch.

8. A security apparatus comprising:

a housing;

an actuator means retained by and rotatable between predetermined stations within said housing, said actuator defining a keyway for receiving a key;

operator means for effecting control functions in response to rotation of said actuator means into said predetermined stations;

locking tumbler means coupled between said housing and said actuator means and extending into said keyway, said locking tumbler means being biased in a locking position and movable into a shear position by a proper key in said keyway;

locking tumbler blocking means preventing rotational movement of said actuator means from a locked station with said locking tumbler means in said locking positions and allowing rotational movement thereof with said locking tumbler means in said shear positions;

first directional tumbler means coupled between said housing and said actuator means and extending into said keyway, said first directional tumbler means being movable between a quiescent position and an active position by a proper key in said keyway;

first blocking means allowing rotation of said actuator means in one direction from said locked station and preventing rotation thereof in the opposite direction with said first tumbler means in said quiescent position, and allowing rotation of said actuator means in said opposite direction from said locked station with said first tumbler means in said active position;

second directional tumbler means coupled between said housing and said actuator means and extending into said keyway, said second directional tumbler means being movable between a primary position and an auxiliary position by a proper key in said keyway;

second blocking means allowing rotation of said actuator means in said one direction from said locked station with said second tumbler means in said primary position, and allowing rotation of said actuator means in said opposite direction from said locked station and preventing rotation thereof in said one direction with said second tumbler means in said auxiliary position;

a first control key insertable into said keyway and bitted so as to pull said locking tumbler means into said shear position, to cause said first directional tumbler means to be in said quiescent position, and to cause said second directional tumbler means to be in said primary position; and a second control key insertable into said keyway and bitted so as to pull said locking tumbler means into said shear position to cause said first directional tumbler means to be in said active position, and to cause said second directional tumbler means to be in said [primary] *auxiliary* position.

9. An apparatus according to claim 8 including a master key insertable into said keyway and bitted so as to pull said locking tumbler means into said shear position, to cause said first directional tumbler means to be in said active position, and to cause said second directional tumbler means to be in said primary position.

10. An apparatus according to claim 8 including first stop means preventing rotation of said actuator means in said one direction beyond a first station circumferentially spaced from said locked station, and second stop means preventing rotation of said actuator means in said opposite direction beyond a second station circumferentially spaced from said locked station.

11. A lock according to claim 10 including a tumbler stop effective with said second tumbler means in said [other] *auxiliary* position to prevent rotation of said actuator means in said opposite direction beyond a third station circumferentially spaced between said locked station and said second station, and wherein said second tumbler means is movable by a proper key in said keyway into an intermediate position wherein said second blocking means prevents rotation of said actuator means in said one direction from said locked station and said tumbler stop means allows rotation of said actuator means between said locked, second and third stations.

12. An apparatus according to claim 11 including a third control key insertable into said keyway and bitted so as to pull said locking tumbler means into said shear position, to cause said first directional tumbler means to be *in* said active position, and to cause said second directional tumbler means to be in said intermediate position.

13. An apparatus according to claim 12 including a master key insertable into said keyway and bitted so as to pull said locking tumbler means into said shear position, to cause said first directional tumbler means to be in said active position, and to cause said second directional tumbler means to be in said primary position.

14. A lock according to claim 8 wherein said first directional tumbler means is biased in said quiescent position, and said second directional tumbler means is biased in said primary position.

15. A lock according to claim 14 wherein said actuator means defines an entry to said keyway, said tumbler means extend into said keyway at axially spaced locations therein so as to be sequentially engaged by a key entering said keyway, said first directional tumbler means is the nearest to said entry, and said second directional tumbler means is located between said first directional tumbler means and said locking tumbler means.

16. A lock according to claim 15 wherein said actuator means is a cylindrical plug, said housing is a hollow cylinder, and said first and second blocking means and said tumbler stop means comprise splines formed in the inner surface of said hollow cylinder so as to engage portions of said first and second directional tumbler means extending out of said actuator means.

17. A lock according to claim 16 wherein said operator means comprises means for operating an electrical switch.

* * * * *